US009025672B2

(12) United States Patent
Duenas et al.

(10) Patent No.: US 9,025,672 B2
(45) Date of Patent: May 5, 2015

(54) ON-DEMAND INTRA-REFRESH FOR END-TO END CODED VIDEO TRANSMISSION SYSTEMS

(75) Inventors: Alberto Duenas, Mountain View, CA (US); Francisco J. Roncero Izquierdo, Leganes (ES); Gorka Garcia, Madrid (ES)

(73) Assignee: Cavium, Inc., San Jose, CA (US)

( * ) Notice: Subject to any disclaimer, the term of this patent is extended or adjusted under 35 U.S.C. 154(b) by 686 days.

(21) Appl. No.: 13/067,050

(22) Filed: May 4, 2011

(65) Prior Publication Data

US 2012/0281766 A1    Nov. 8, 2012

(51) Int. Cl.
*H04N 7/12* (2006.01)
*H04N 11/02* (2006.01)
*H04N 11/04* (2006.01)
*H04N 19/166* (2014.01)
*H04N 19/176* (2014.01)
*H04N 19/172* (2014.01)
*H04N 19/107* (2014.01)

(52) U.S. Cl.
CPC .......... *H04N 19/166* (2014.11); *H04N 19/176* (2014.11); *H04N 19/172* (2014.11); *H04N 19/107* (2014.11)

(58) Field of Classification Search
USPC ........................................ 375/240.01–240.27
See application file for complete search history.

(56) References Cited

U.S. PATENT DOCUMENTS

| | | | |
|---|---|---|---|
| 2006/0013320 A1* | 1/2006 | Oguz et al. | 375/240.27 |
| 2006/0078051 A1* | 4/2006 | Liang et al. | 375/240.24 |
| 2007/0014360 A1* | 1/2007 | Botzko et al. | 375/240.16 |
| 2008/0176517 A1* | 7/2008 | Lee et al. | 455/63.1 |
| 2009/0252227 A1* | 10/2009 | NepomucenoLeung et al. | 375/240.13 |
| 2010/0054329 A1* | 3/2010 | Bronstein et al. | 375/240.03 |
| 2010/0150230 A1* | 6/2010 | Zhou et al. | 375/240.12 |

OTHER PUBLICATIONS

International Search Report and Written Opinion issued to International Patent Application No. PCT/US12/36648, Aug. 10, 2012, 9 pgs.

* cited by examiner

*Primary Examiner* — Andy Rao
*Assistant Examiner* — Jared Walker
(74) *Attorney, Agent, or Firm* — Cooley LLP

(57) ABSTRACT

A video transmission system includes an encoder and a decoder. Data may be lost during video encoding and transmission, which leads to errors in reconstructing the video images by the decoder. A return channel couples the encoder and decoder so that errors detected by the decoder are made available to the encoder. Depending on the percentage of the image not received, refresh operations are performed. An on-demand intra-refresh operation is done when the percentage of the image needed to be refreshed is below a specified level. A random intra-refresh operation is done when the percentage of the image needed to be refreshed exceeds the level.

11 Claims, 7 Drawing Sheets

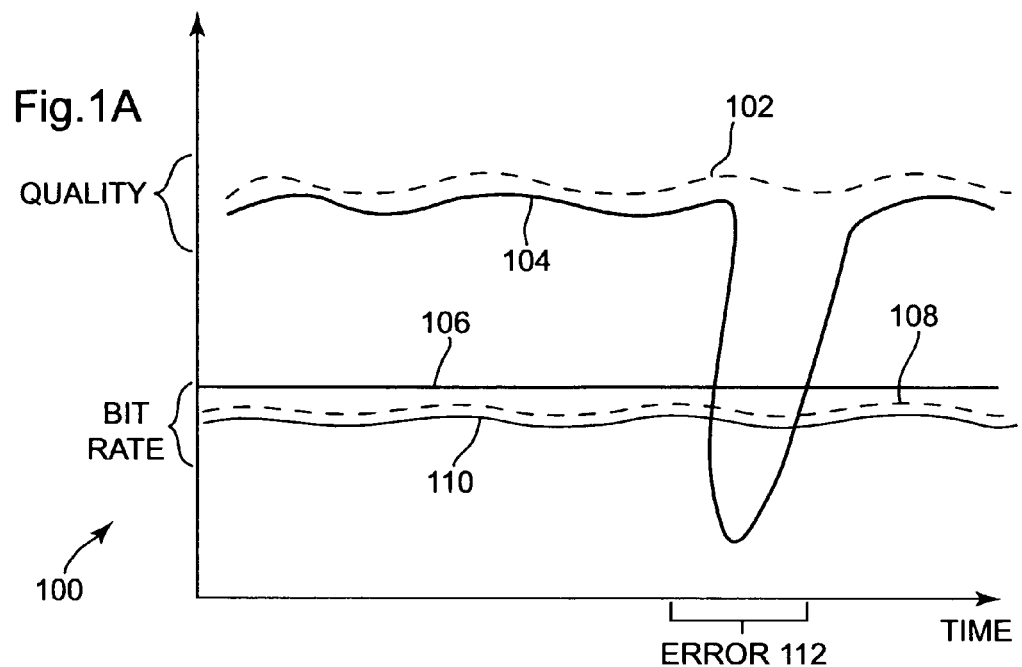
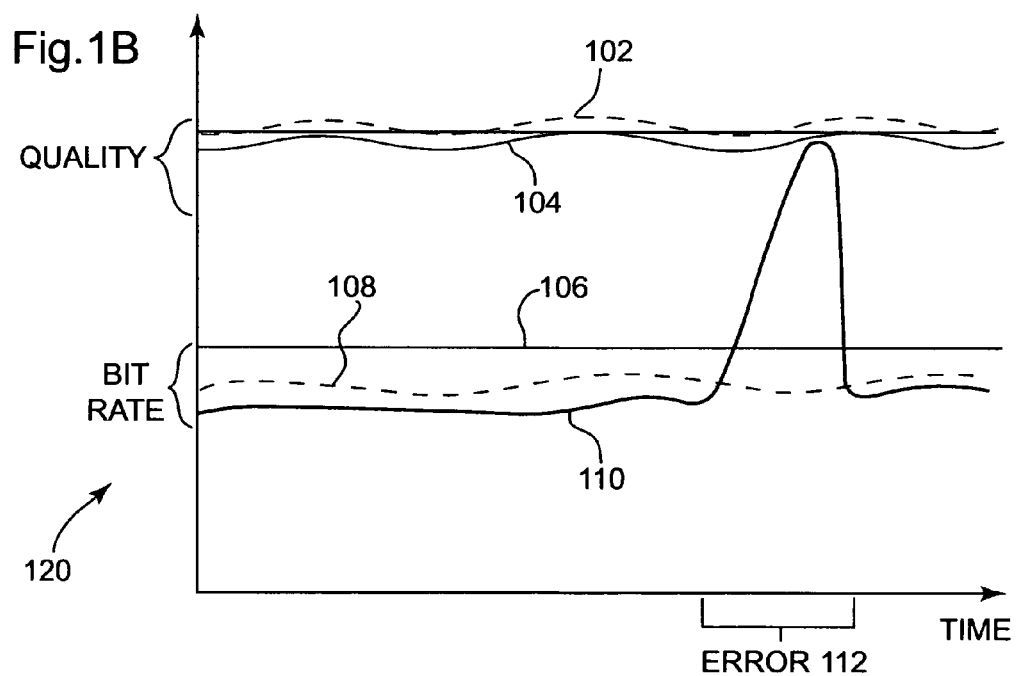

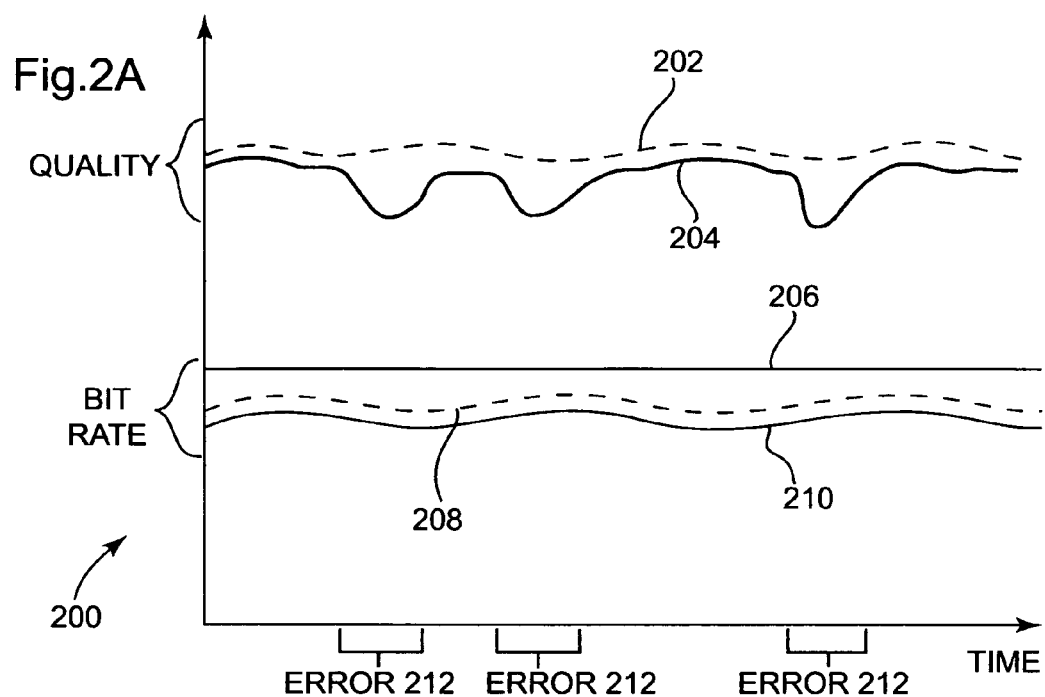
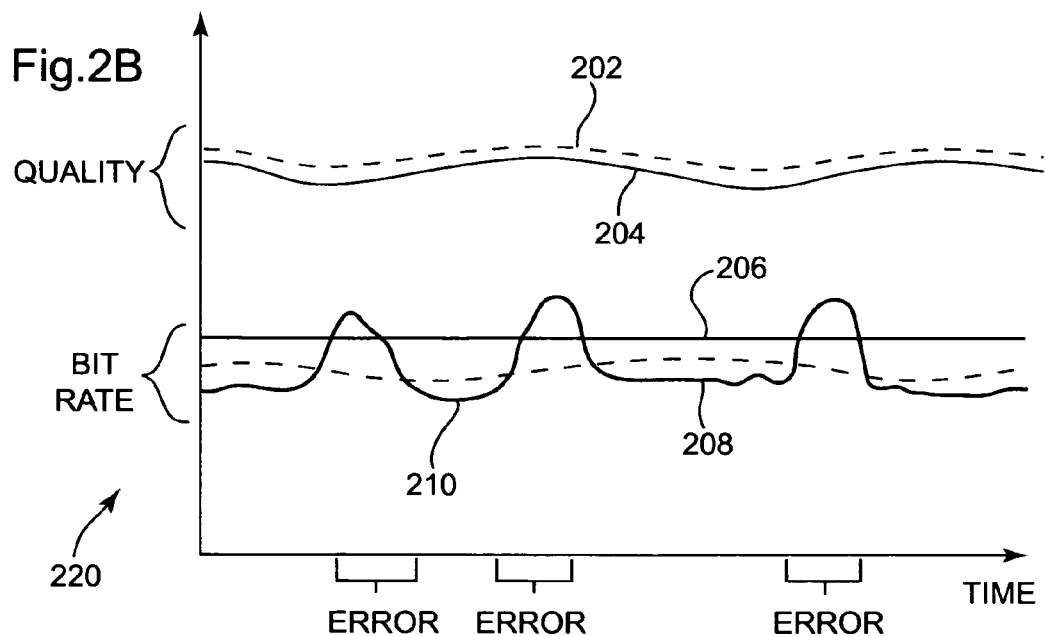

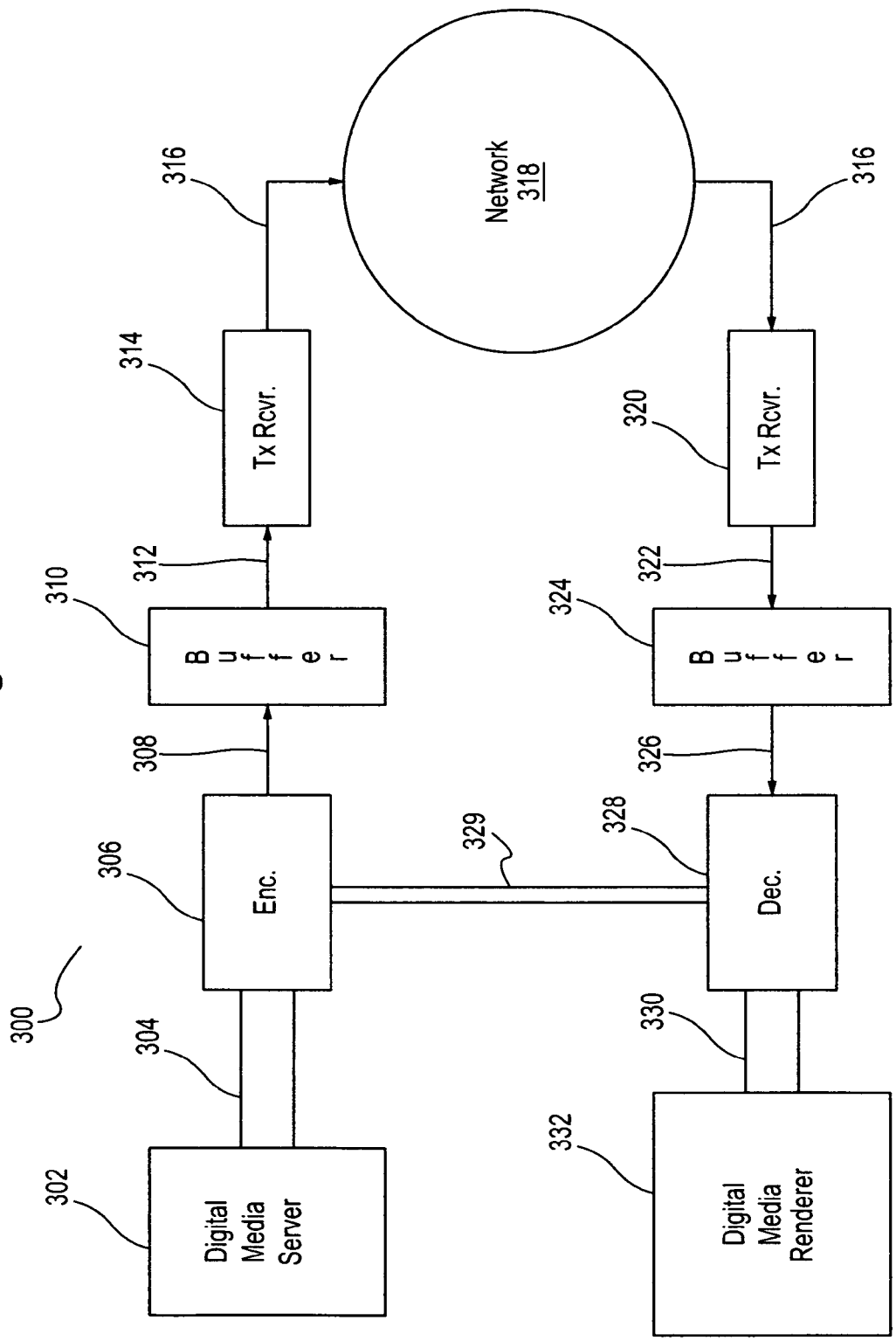

ON-DEMAND INTRA-REFRESH FOR END-TO END CODED VIDEO TRANSMISSION SYSTEMS

FIELD OF THE INVENTION

The present invention relates to transferring video signals over a network. More particularly, the present invention relates to reducing the impact on the image quality when transmission errors occur, and some of the information is lost or corrupted, by introducing intra-frame prediction into portions of an image.

DISCUSSION OF THE RELATED ART

Before transmitting video content over a network, a video frame is compressed using an algorithm to encode the data. To reduce the amount of data to encode, known video transmission systems may use prediction processes. Typical video compression standards may consider two main types of prediction. One type is intra-frame prediction that uses the information of the current frame coded up to that current location for each part of a video frame. In other words, intra-frame prediction uses information from the current frame.

Another type is inter-frame prediction. Inter-frame prediction uses the information from previous or future coded image frames for each part of the current frame and takes advantage of temporal redundancy between frames to achieve higher compression rates. If a scene does not change significantly from one from to the next, then inter-frame prediction reduces the encoding workload by predicting the macroblocks remain the same.

Each type suffers from drawbacks. The compression efficiency for each type differs for a wide range of applications and scenarios. Depending on system requirements, such as bandwidth and latency, the use of intra-frame predicted frames may be undesirable for an acceptable quality or performance level. For example, intra-frame encoding may require encoding the raw pixels for each macroblock. Bandwidth in the video transmission system may increase as a result. Systems with latency constraints may be faced with losing blocks as the compression ratio is lower and intra-frame encoding tends to consume more bits than inter-frame encoding. Thus, inter-frame prediction may be a better alternative.

On the other hand, intra-frame prediction may be needed for error resilience purposes. Video transmission systems introduce errors that manifest in the decoded images. After decoding, errors occur due to possible data loss or corruption of the data. Some systems may introduce an intra-frame every so often to prevent the onset of noticeable errors, but this process may not be feasible in low latency systems because the bit rate spikes upward significantly or the quality level drop below acceptable levels.

As shown in FIGS. 1A and 1B, use of an intra-frame results in negative impacts on the video transmission. The scenarios shown in either FIG. 1A or 1B may occur when an error occurs within the video transmission. FIG. 1A depicts a graph 100 showing the quality of the decoded video within the system having a constant bit rate over time for complete intra-frame refresh. In FIG. 1A, the bit rate stays constant throughout the process while the quality of the video fluctuates. Dotted line 102 represents the quality level of the video content without any errors in the transmission. Dotted line 102 remains steady or approximately within a small range over time without any noticeable degradation to video quality.

Line 104 represents video quality when error 112 occurs, and an intra-frame refresh image is introduced. Line 104 also remains steady until the time that error 112 occurs, or is detected. Then, the level of quality drops significantly, and results in noticeable problems to a user. The image may become distorted or shaded due to the drop in quality. This drop occurs due to the need for a constant bit rate, possibly required by system constraints. Line 106 represents the network bit rate capacity. As long as the bit rate remains below line 106, then no latency problems occur within the video transmission system.

Dotted line 108 represents the bit rate without an error within the video transmission system. Dotted line 108 remains steady over time, and within a reasonable range that does not cause any problems within the network. Line 110 represents the bit rate when error 112 occurs. Unlike line 104 above, line 110 does not change in value despite error 112. Thus, no latency problems happen on the network, but a noticeable drop in quality occurs as a result of introducing the intra-frame refresh image.

FIG. 1B depicts a graph 120 showing the fluctuation of the bit rate having a constant quality level over time for complete intra-frame refresh. Dotted lines 102 and 108 remain steady for those scenarios where an error does not occur, and an intra-frame refresh is not needed. Because quality remains constant in FIG. 1B, line 104 also remains steady over time. Line 110 for the bit rate, however, increases dramatically due to the increased coding needed to handle the intra-frame refresh image. The complexity of the received data increases due to the new image and the bit rate exceeds the network capacity to handle this increase, as shown by line 106 at error 112. Latency will be introduced into the video transmission system. For a low latency system, buffering problems also will occur.

Thus, use of an intra-frame refresh image may not be feasible for systems desiring a constant level of quality without exceeding network bit rate capacity. For a low latency video transmission system, intra-frame prediction may recover corrupted images once the error occurs. Use of intra-frame prediction may clean the artifacts resulting from corrupted data and recovers the quality level desired of the decoded video content. The frame may be broken into slices by the encoder, or segments, and encoded separately. This process, however, may cause distortion that moves through the frame and reduces the quality of the video content. The intra-predicted slices are visibly noticeable. Moreover, if quality is maintained, the bit rate may increase along with latency, but not as significantly as with an intra-frame refresh image.

FIGS. 2A and 2B shows the negative impacts caused by intra-frame prediction over segments of an image. FIG. 2A depicts a graph 200 showing the quality of the decoded video within a video transmission system having a constant bit rate over time for a partial intra-frame predicted refresh. Dotted line 202 represents the quality of the video content over time without any errors in the transmission. Line 204 represents the quality of the video content when errors 212 occur. Errors 212 may result in intra-frame segment refresh so that only the segment containing the error is encoded using intra-frame prediction.

Line 204 drops in quality, but not as significantly as line 104 in FIG. 1A. Line 204, however, reduces in quality more than one period of time. Quality will suffer for the segment transmitted at those times, such that part of the image is distorted or shaded. This action results in a bad quality image as the segment is recovered using intra-frame prediction. Line 206 represents the network bit rate capacity, while dotted line 208 represents the bit rate without any errors occurring in the video transmission system. Line 210 represents the bit rate when errors 212 occur. Like line 110 in FIG. 1A, line 210 does not fluctuate significantly due to errors 212 and stays below line 206.

FIG. 2B depicts a graph 220 showing bit rate fluctuation within a video transmission system having constant quality over time for a partial intra-frame predicted refresh. As in FIG. 2A, dotted lines 202 and 208 remain steady over time because no errors occur in the video transmission system. Line 204 also remains steady due to the need for near-constant quality in the video images. Line 210 shows that the bit rate increases due to error 212. Though not a significant as line 110 in FIG. 1B, line 210 exceeds the network bit rate capacity, as shown by line 206. Thus, when errors 212 occur, latency problems will arise due to the bit rate fluctuations.

SUMMARY OF THE INVENTION

Embodiments of the present invention disclose an on-demand intra-refresh for end-to-end coded video transmission system. The system seeks to provide a compromise between error resilience and quality performance while reducing or eliminating the use of intra-frame refresh frames or images. The disclosed system introduces intra-frame prediction in portions of a video image. The entire frame is mapped in a table as random macroblocks, so that each part of the map may be requested independently to be refreshed when an error occurs.

The disclosed system includes a return channel from the decoder so that the decoder side may inform the encoder which part of the image must be refreshed. The encoder and decoder may use a protocol to establish when random refreshing and requested refreshing happens. The protocol also may control the percentage of the image being refreshed in each frame. This control mechanism seeks to avoid scenarios in which the refreshed portion of the image results in similar quality lapses or bit rate fluctuations found by using an entire intra-frame refresh frame.

According to the preferred embodiments, a video transmission system is disclosed. The video transmission system includes an error detector within a decoder to detect errors within macroblocks of a decoded image. The video transmission system also includes an error resolution module within an encoder coupled to the error detector with a return connection. The error resolution module determines a percentage of macroblocks having errors. The video transmission system also includes a refresh tool within the encoder to refresh the decoded image based on the percentage of macroblocks.

Further according to the preferred embodiments, a method for refreshing an image within a video transmission system. The method includes detecting errors in macroblocks within the image at a decoder. The method also includes receiving the errors in the macroblocks at an encoder having a return connection to the decoder. The method also includes determining whether the errors in the macroblocks exceed a percentage. The method also includes performing an on-demand intra-refresh if the errors in the macroblocks are equal or do not exceed the percentage. The method also includes performing a random intra-refresh if the errors in the macroblocks exceed the percentage.

Further according to the preferred embodiments, a method for intra-refreshing an image within a video transmission system is disclosed. The method includes receiving identified errors in macroblocks within the image. The method also includes performing an intra-refresh process in response to the identified errors. The method also includes refreshing a set of macroblocks for the image.

BRIEF DESCRIPTION OF THE DRAWINGS

The accompanying drawings are included to provide further understanding of the invention and constitute a part of the specification. The drawings listed below illustrate embodiments of the invention and, together with the description, serve to explain the principles of the invention, as disclosed by the claims and their equivalents.

FIG. 1A illustrates a graph showing the quality of the decoded video within the system having a constant bit rate over time for complete intra-frame refresh.

FIG. 1B illustrates a graph showing the fluctuation of the bit rate having a constant quality level over time for complete intra-frame refresh.

FIG. 2A illustrates a graph showing the quality of the decoded video within a video transmission system having a constant bit rate over time for a partial intra-frame predicted refresh.

FIG. 2B illustrates a graph showing bit rate fluctuation within a video transmission system having constant quality over time for a partial intra-frame predicted refresh.

FIG. 3 illustrates a system for transmitting and receiving video signal data according to the disclosed embodiments.

DETAILED DESCRIPTION OF THE PREFERRED EMBODIMENTS

Figure 4:
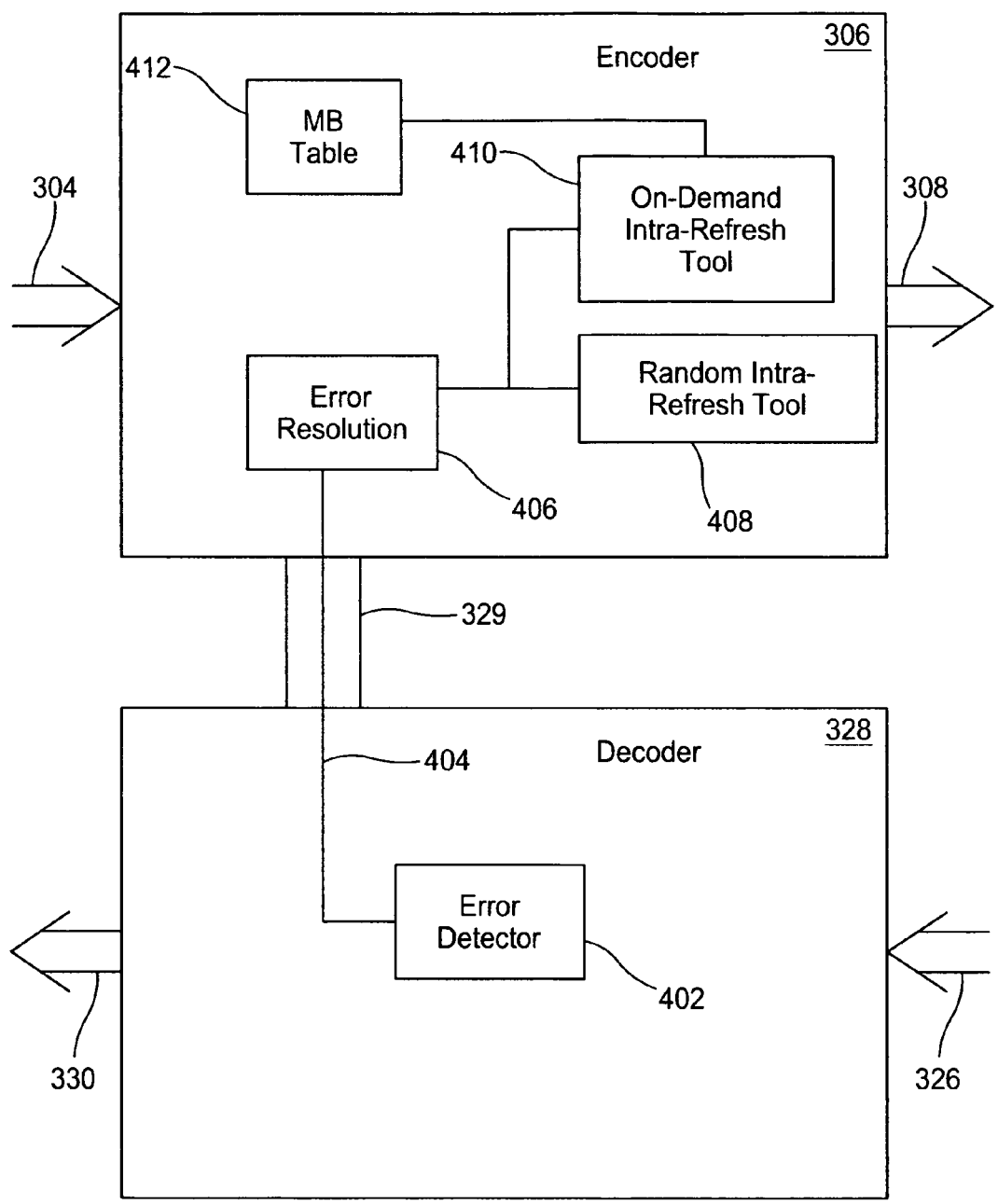
FIG. 4 illustrates a block diagram of an encoder and a decoder according to the disclosed embodiments.

Aspects of the invention are disclosed in the accompanying description. Alternate embodiments of the present invention and their equivalents are devised without parting from the spirit or scope of the present invention. It should be noted that like elements disclosed below are indicated by like reference numbers in the drawings.

FIG. 3 depicts a system 300 for transmitting and receiving video signal data according to the disclosed embodiments. System 300 may be any system or collection of devices that connect over a network to share information. Video content may be delivered real-time such that very little or no latency is experience in transmitting the video signals. The video signals include frames of images delivered to the viewer. Low latency video transmission systems, for example, may be desirable for security monitoring.

Digital media server 302 generates the video content to be transmitted. Digital media server 302 may be any device, console, camera and the like that captures video data. For example, digital media server 302 is a gaming console that plays videogames stored on disk or other medium. The content generated from playing the game is displayed for a user to view and interact with in real-time. Alternatively, digital media server 302 is a computer, video recorder, digital camera, scanner and the like that captures video data as images to be encoded.

Uncompressed data signal 304 is output from digital media server 302 to encoder 306. Encoder 306 may encode or compress signal 304 for transmission within system 300. Encoder 306 is disclosed in greater detail below. Encoder 306 may use known quantization and coding techniques to transform an image within uncompressed data signal 304 into data transmittable over network 318. In this transformation, however, some data may be lost or corrupted.

Encoder 306 outputs coded signal 308 to buffer 310. Buffer 310 stores data from signal 308 until it can be transmitted through system 300. If the network bit rate does not allow transmission of signal 308, then buffer 310 holds the data until such time it can be transmitted by transceiver 314. Buffer 310 outputs signal 312 to transceiver 314.

Transceiver 314 transmits signal 316 over network 318. Network 318 may be any collection of devices transmitting and receiving data, such as a wireless or wired network that delivers video data to viewers on network 318. Alternatively, network 318 may be a network of computers receiving signal 316 from a remote camera showing real-time video.

Transceiver 320 receives signal 316 and outputs signal 322 to buffer 324. Signal 326 streams from buffer 310 to decoder 328. Decoder 328 decodes or uncompresses signal 326 to generate uncompressed signal 330. Decoder 328 also is disclosed in greater detail below. Decoder 328 also may detect errors within signal 326 that manifest themselves within uncompressed signal 330. Decoder 328 may be coupled to encoder 306 via return channel 329.

Uncompressed signal 330 preferably is a high quality copy of uncompressed signal 304, with slight variations due to the coding process. Digital media renderer 332 receives uncompressed signal 330 and displays the video data content to the user. Digital media renderer 332 may be a high-definition television having display resolutions of 1,280×720 pixels (720p) or 1,920×1,080 pixels (1080i/1080p).

System 300 is subject to various constraints and parameters. System 300 may transmit over network 318 at a constant bit rate. This bit rate remains the same over time, but, however, may change under certain circumstances. A delay or integration time may occur as buffer 310 fills up, which causes latency within system 300 as data is sent over network 318.

FIG. 4 depicts a block diagram of encoder 306 and decoder 328 according to the disclosed embodiments. As shown, encoder 306 receives uncompressed data signal 304 and generates coded signal 308. Decoder 328 receives coded signal 326 and generates uncompressed data signal 330. Uncompressed data signal 330 preferably is a high quality representation of uncompressed data signal 304. Encoder 306 and decoder 328 includes other features than those shown, and may include those parts of known encoders and decoders.

Decoder 328 receives the data within coded signal 326 and reconstructs the images within the frames for uncompressed data signal 330. A certain number of frames should be received over a period of time, such as 60 frames per second. In the inverse transformation of the data, errors may occur or data may be lost. This data may be refreshed by encoder 306 so that parts of the resulting image are not missing or incomprehensible.

Decoder 328 includes error detector 402 that identifies and detects errors within the image. As disclosed in greater detail below, a video image is broken in macroblocks that are encoded by encoder 306. Decoder 328 decodes the data for each macroblock. During this process, some macroblocks may be lost or distorted to the point that they need to be refreshed. Moreover, groups of macroblocks may be lost or in error and segments of the video image also are lost. Error detector 402 notes the problematic macroblocks while decoder 328 reconstructs each image.

Decoder 328 is coupled to encoder 306 via return channel 329. Error detector 402 communicates with encoder 306 using return connection 404 within return channel 329. Return connection 404 may be ad-hoc in that it is created when error detector 402 needs to identify an error to encoder 306. If decoder 328 is not in use, then return connection 404 may be disabled.

Encoder 306 includes error resolution module 406 coupled to error detector 402. Error resolution module 406 receives an indication that an error or series of errors have occurred in reconstructing an image frame within decoder 328. Error resolution module 406 then undertakes a course of action depending on the percentage of macroblocks in the image impacted by the error. This process is disclosed in greater detail below.

If the percentage of macroblocks is greater than a specified amount, then encoder 306 uses random intra-refresh tool 408 to refresh the image within the frame at decoder 328. For large errors, the refreshed portion may result in the problems associated with using an entire intra-refresh frame. The quality would suffer noticeably or the bit rate fluctuation may cause latency problems. In this scenario, random macroblocks are chosen to be refreshed within the image. Using random macroblocks prevents a noticeable change in video quality while avoiding significant bit rate fluctuation. This process is disclosed in greater detail by FIG. 5.

If error resolution module 406 determines that the percentage of errors within the image is below a certain amount, then encoder 306 may use on-demand intra-refresh tool 410 to refresh those macroblocks identified by error detector 402. Unlike random intra-refresh tool 408, on-demand intra-refresh tool 410 only refreshes those macroblocks that have transmission errors associated with them. Thus, the refresh operations of encoder 306 do not cause a noticeable drop in video quality or significant bit rate fluctuations as only those macroblocks targeted by decoder 328 are re-coded and transmitted within system 300.

On-demand intra-refresh tool 410 accesses macroblock table 412 while refreshing an image having errors to determine which macroblocks to refresh. Encoder 306 maps each macroblock of the image into macroblock table 412 to provide a reference for on-demand intra-refresh tool 410 when refreshing portions of the image. Decoder 328 indicates a zone or portion of the image that is in error or not available and on-demand intra-refresh tool 410 determines those macroblocks within the portion from macroblock table 412 that best fits the lost portion of the image.

Thus, using on-demand intra-refresh tool 410, decoder 328 determines which portions of the image are to be refreshed. Decoder 328 may fill its own table with the request for refresh and send to encoder 306. If the table exceeds the amount or percentage allowed for on-demand intra-refresh, then error resolution module 406 enables random intra-refresh tool 408. Conversely, random intra-refresh tool 408 determines which macroblocks to be refreshed, and not decoder 328. In fact, random intra-refresh tool 408 may perform its functions when return channel 329 is not available such that some refresh tool is available at all times within system 300.

Figure 5:
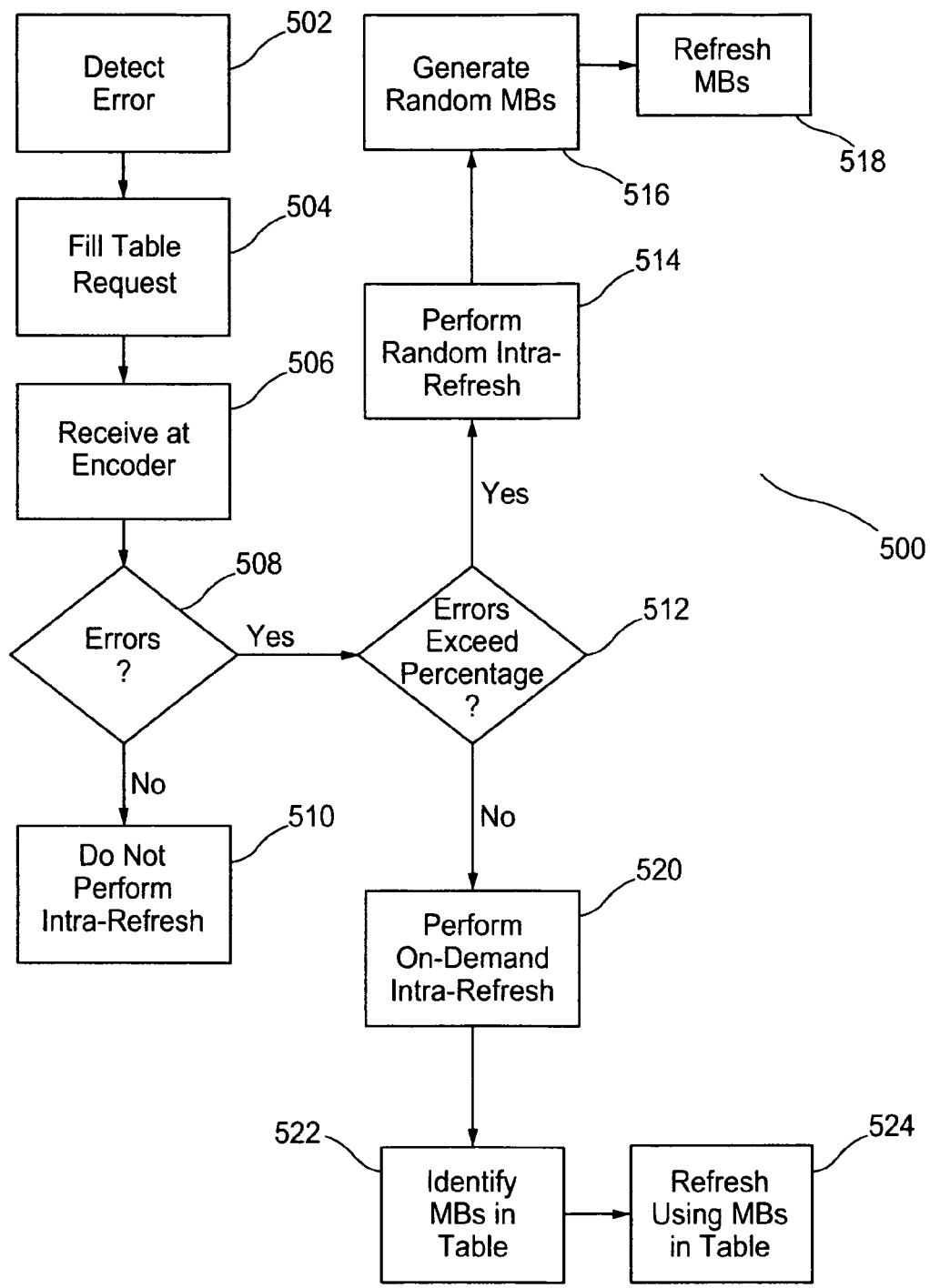
FIG. 5 illustrates a flowchart for refreshing an image within the video transmission system according to the disclosed embodiments.

FIG. 5 depicts a flowchart 500 for refreshing an image within video transmission system 300 according to the disclosed embodiments. The process disclosed by flowchart 500 may be used in conjunction with the devices and elements of the present invention shown in FIGS. 3 and 4.

Step 502 executes by detecting an error within an image reconstructed by decoder 328 by error detector 402. The error may include one or more macroblocks within the image. Step 504 executes by filling a table request by decoder 328. The table request should identify those macroblocks compromised by the error conditions within the image. Further, the table request should be able to show the percentage of blocks having an error condition within the image.

Step 506 executes by receiving the table request at encoder 306. Specifically, error resolution module 406 receives the request from error detector 402. Step 508 executes by determining whether any errors are identified by the request. If no, then step 510 executes by not performing any intra-refresh operations. Essentially, decoder 328 reconstructs the image without any refreshed macroblocks from encoder 306.

If step 508 determines that errors are within the image, then step 512 executes by determining whether the errors identified by decoder 328 exceed a specified percentage. For example, the percentage may be 40%. Thus, if the image needs more than 40% of its macroblocks refreshed as identified in the table request, then video quality will noticeably suffer or latency issues will occur due to bit rate fluctuation. Proceeding with an on-demand intra-refresh would be like sending a intra-frame refresh of the entire image.

Thus, if step 512 is yes, then step 514 executes by performing random intra-refresh operations. Step 516 executes by generating random macroblocks within the image to be refreshed by encoder 306. Step 518 executes by refreshing the randomly selected macroblocks to decoder 328.

Figure 6:
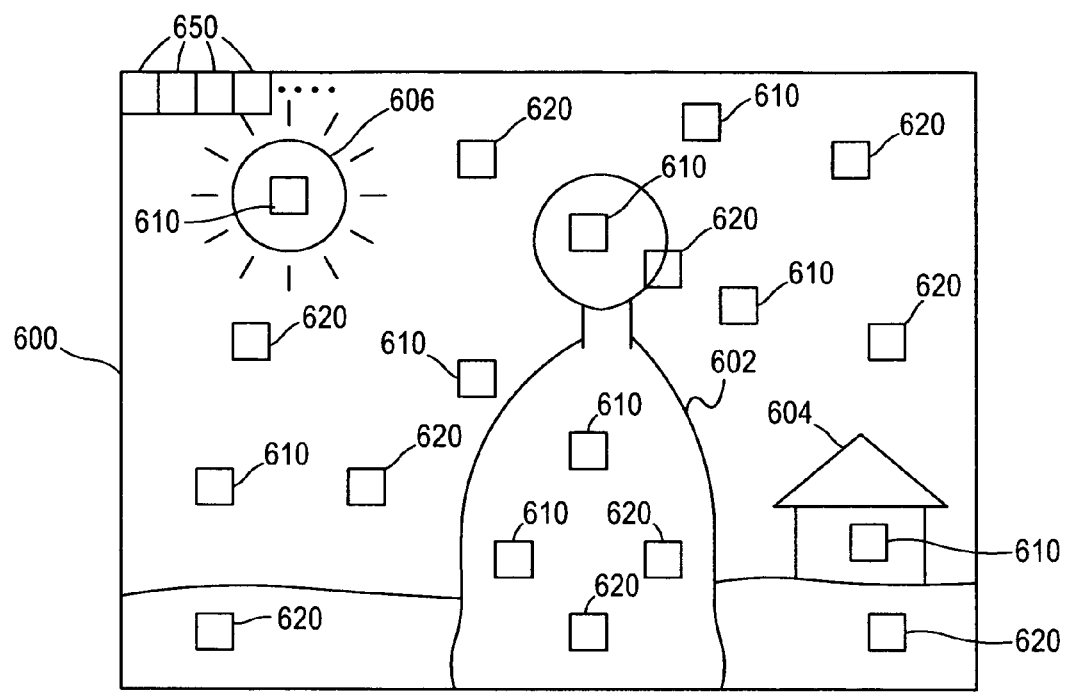
FIG. 6 illustrates an image subject to random intra-refresh according to the disclosed embodiments.

Steps 514-518 may disclosed in greater detail by FIG. 6. FIG. 6 depicts an image 600 subject to random intra-refresh according to the disclosed embodiments. Random intra-refresh tool 408 randomly selected macroblocks for refresh within image 600.

Image 600 may be broken into macroblocks 650. Macroblocks 650 includes a set number of pixels, such as 8 by 8 or 16 by 16. Each macroblock is coded by encoder 306 such that every pixel within image 600 is encoded for transmission. Parameters for the macroblocks will differ as each represents different parts of image 600. For example, image 600 may include person 602, structure 604 and light source 606. Each macroblock will include values for luminance, color and motion vectors that are reconstructed by decoder 328.

As determined in step 512, errors within image 600 are so great that an on-demand refresh is not feasible. Thus, random intra-refresh tool 408 selects random macroblocks 650 for refresh so as to not compromise image quality or incur significant bit rate fluctuations. In the first instance, randomly selected macroblocks 610 are selected for refresh by encoder 306. Macroblocks 610 are refreshed, or coded again, and sent to decoder 328 to mitigate the errors detected within image 600. If another random intra-refresh is needed, then random intra-refresh tool 408 may randomly select macroblocks 620 within image 600. Using the random intra-refresh, enough portions of image 600 is refreshed to overcome the detected errors.

If step 512 is no, then step 520 executes by performing on-demand intra-refresh operations on the image using on-demand intra-refresh tool 410 and macroblock table 412. Step 522 executes by indentifying the macroblocks indicated by decoder 328 as having an error within macroblock table 412. The table request should match the macroblocks within macroblock table 412. Step 524 executes by refreshing the image using the macroblocks from macroblock table 412.

Figure 7:
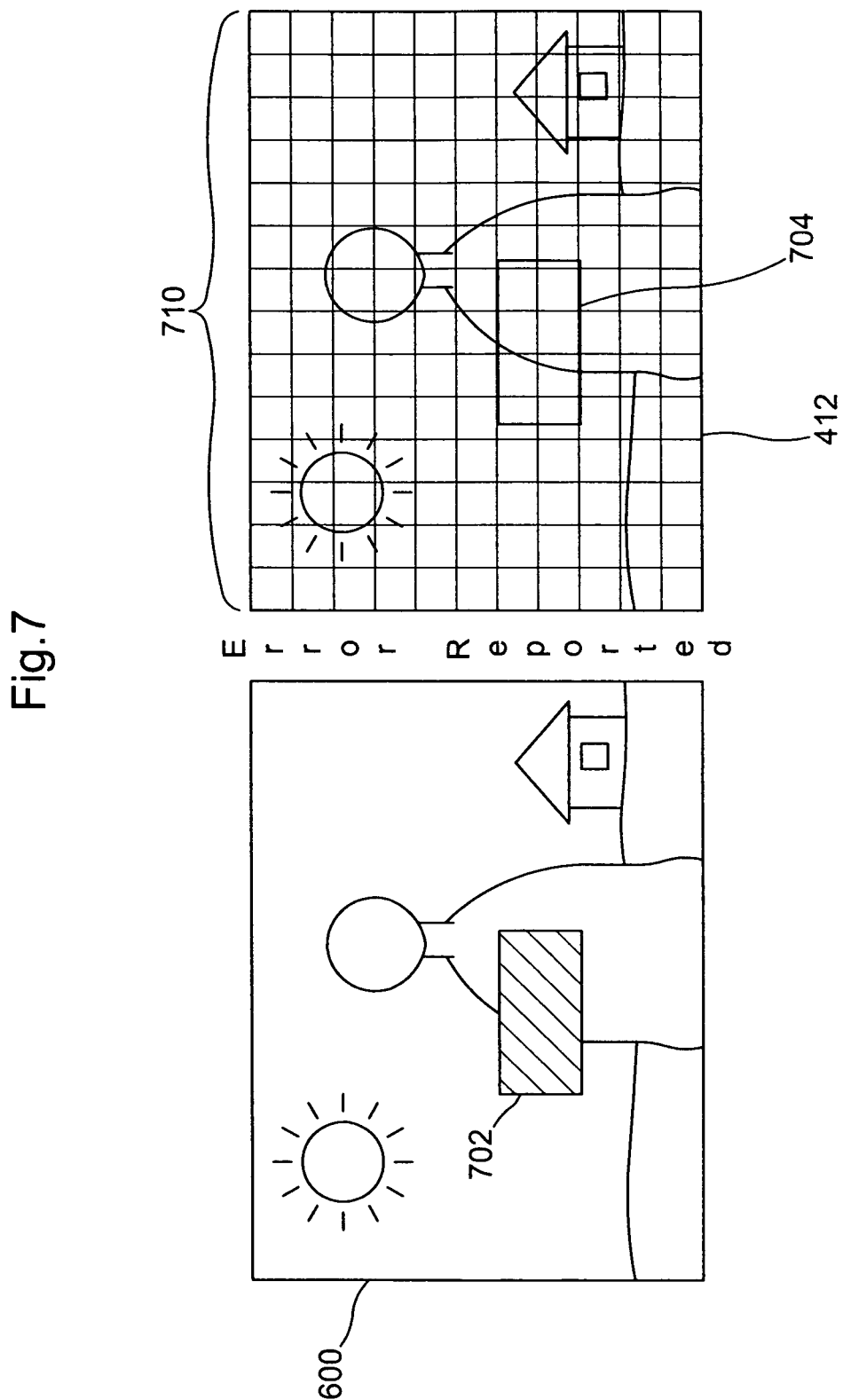
FIG. 7 illustrates an image subject to on-demand intra-refresh and a macroblock table according to the disclosed embodiments.

Steps 520-524 may be disclosed in greater detail by FIG. 7. FIG. 7 depicts an image 600 subject to on-demand intra-refresh and macroblock table 412 according to the disclosed embodiments. Image 600 comprises macroblocks 650, as disclosed above. Macroblock table 412 also includes macroblocks 710 mapped from image 600 that correspond to macroblocks 650.

Image 600 within FIG. 7 includes error portion 702. Macroblocks 650 within error portion 702 are lost or not available when received by decoder 328. Error detector 402 indentifies the macroblocks within error portion 702 to error resolution module 406. Because error portion 702 does not encompass a large percentage of image 600, encoder 306 may intra-refresh its macroblocks.

Thus, random intra-refresh tool 408 identifies refresh portion 704 within macroblock table 412 as corresponding to error portion 702. Encoder 306 then corrects error portion 702 by refreshing macroblocks 710 within refresh portion 704. The number of macroblocks 710 preferably is less than that associated with a random intra-refresh, and, thus, less noticeable from a quality perspective and presents no significant bit rate fluctuation.

Macroblocks 650 may be intra-macroblocks or inter-macroblocks.

Thus, the disclosed embodiments utilize a random intra-refresh tool and operations along with on-demand intra-refresh tool and operations to identify errors within a reconstructed image. The disclosed embodiments mitigate error conditions without decreasing the quality of the video images or incurring significant bit rate fluctuations or latency. Use of intra-frame images is not needed.

It will be apparent to those skilled in the art that various modifications and variations may be made in the disclosed embodiments of the privacy card cover without departing from the spirit or scope of the invention. Thus, it is intended that the present invention covers the modifications and variations of the embodiments disclosed above provided that the modifications and variations come within the scope of any claims and their equivalents.

What is claimed is:

1. A video transmission system, comprising:
an error detector within a decoder to detect errors within macroblocks of a decoded image;
an error resolution module within an encoder coupled to the error detector with a return connection, wherein the error resolution module
determines a percentage of macroblocks having errors,
compares the percentage to a threshold indicative of an on-demand intra-refresh load comparable to an intra-frame refresh of an entire decoded image, and
designates a refresh policy, wherein the refresh policy is a random intra-refresh policy if the percentage is above the threshold, wherein the random intra-refresh policy refreshes macroblocks of a refresh portion corresponding to an error portion, and
an on-demand intra-refresh policy if the percentage is below the threshold, wherein the on-demand intra-refresh policy only refreshes those macroblocks that have transmission errors, such that bit rate fluctuations between the random intra-refresh policy and on-demand intra-refresh policy are not significant; and
a refresh tool within the encoder to refresh the decoded image based on the refresh policy.

2. The video transmission system of claim 1, further comprising a macroblock table to store macroblocks corresponding to the decoded image.

3. The video transmission system of claim 1, further comprising a buffer connected to the encoder, wherein a size of the buffer corresponds to the decoded image.

4. A method for refreshing an image within a video transmission system, the method comprising:
detecting errors in macroblocks within the image at a decoder;

receiving the errors in the macroblocks at an encoder having a return connection to the decoder;

determining whether the errors in the macroblocks exceed a percentage indicative of an on-demand intra-refresh load comparable to an intra-frame refresh of an entire image;

performing an on-demand intra-refresh if the errors in the macroblocks are equal or do not exceed the percentage, wherein the on-demand intra-refresh only refreshes those macroblocks that have transmission errors; and performing a random intra-refresh if the errors in the macroblocks exceed the percentage, wherein the random intra-refresh policy refreshes macroblocks of a refresh portion corresponding to an error portion, such that bit rate fluctuations between the random intra-refresh policy and on-demand intra-refresh policy are not significant.

5. The method of claim 4, further comprising performing no intra-refresh if no errors are detected in the macroblocks.

6. The method of claim 4, further comprising filling a table request with the macroblocks having errors.

7. The method of claim 6, further comprising comparing the table request against a mapped table including the macroblocks in the image.

8. The method of claim 4, wherein the performing the on-demand intra-refresh step includes identifying macroblocks within a table corresponding to the errors of the macroblocks in the image.

9. The method of claim 8, further comprising refreshing the image using the identified macroblocks.

10. The method of claim 4, wherein the performing the random intra-refresh step includes generating a random set of macroblocks of the image.

11. The method of claim 10, further comprising refreshing the random set of macroblocks.

* * * * *